United States Patent Office 3,007,835
Patented Nov. 7, 1961

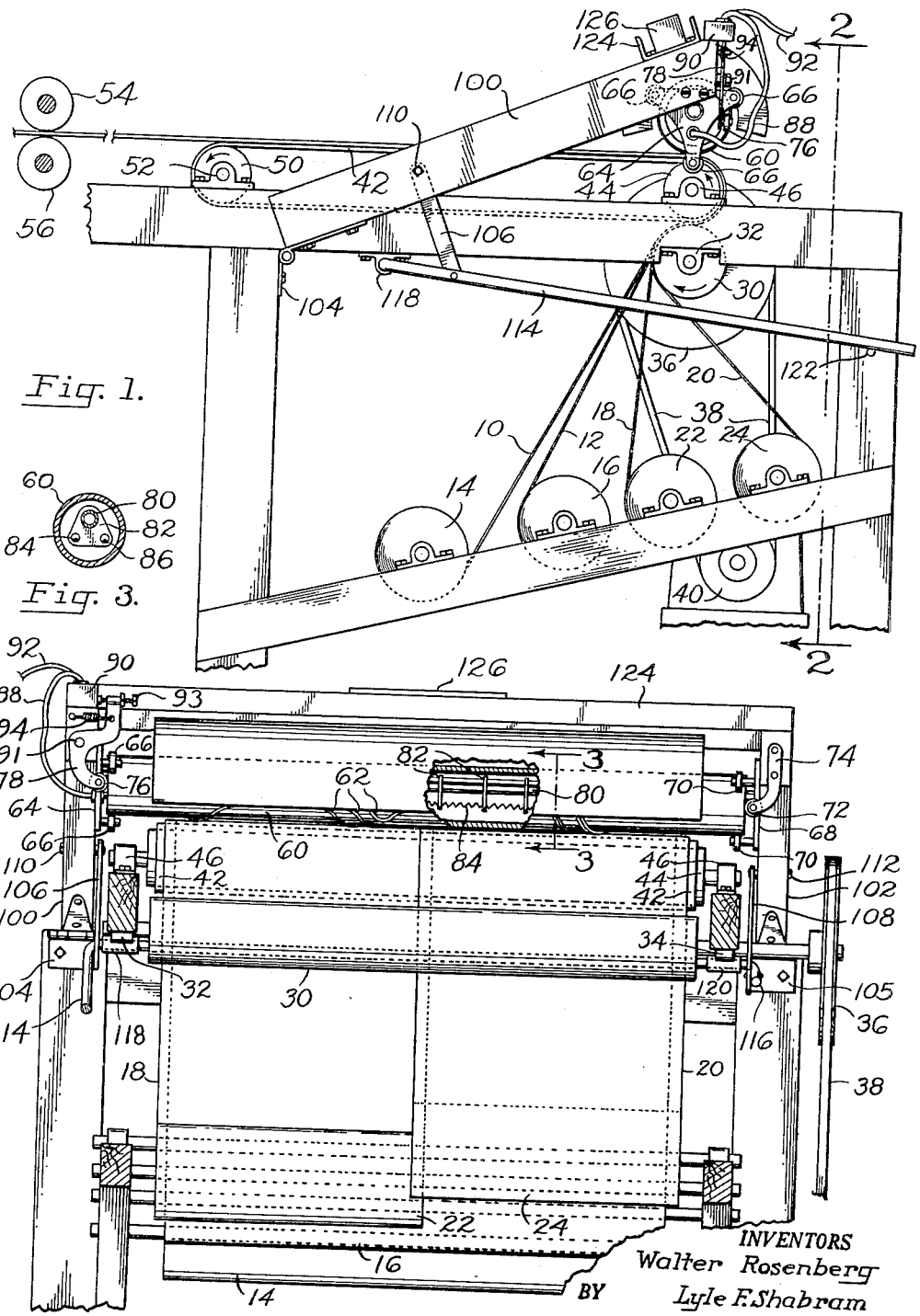

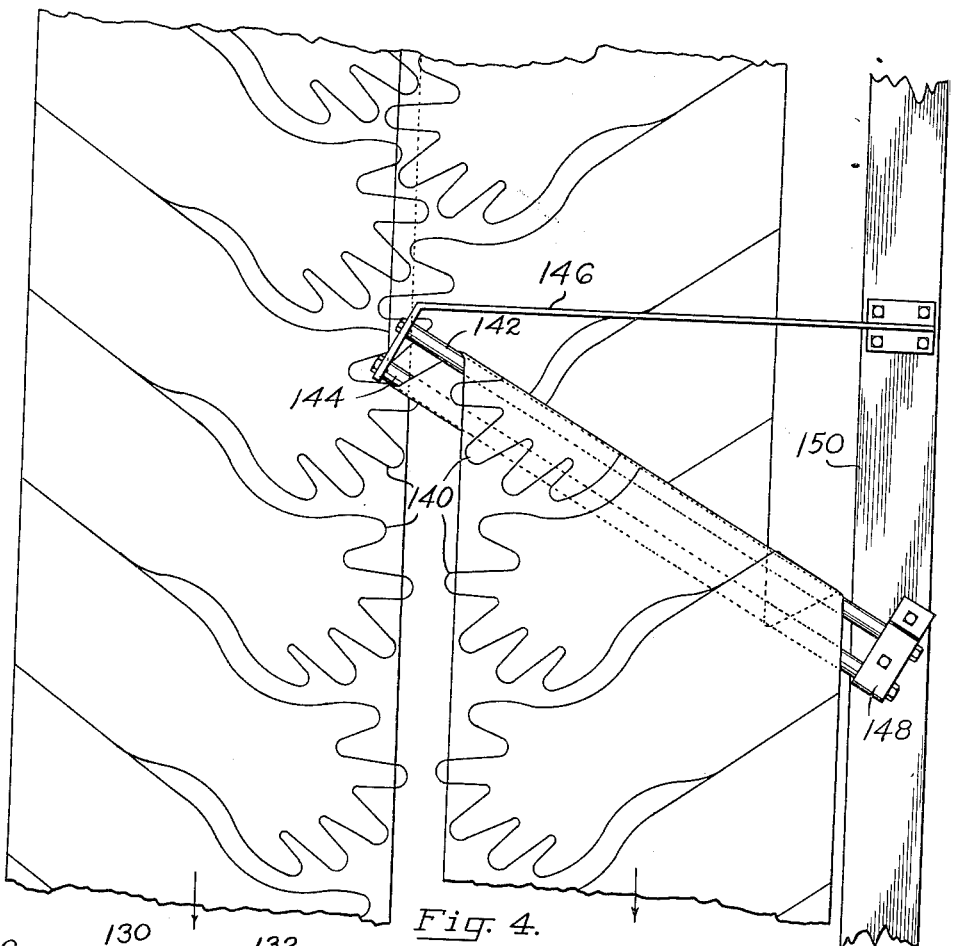
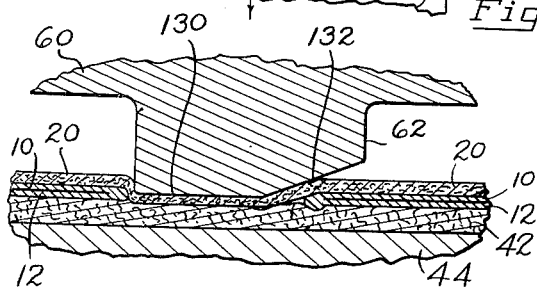
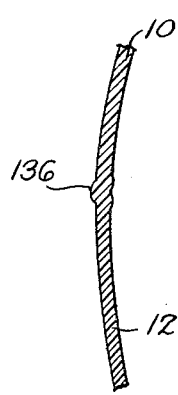
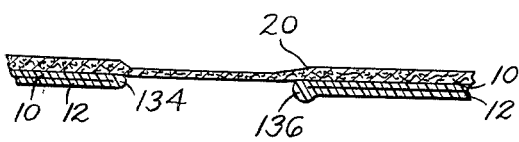
Fig. 4.
Fig. 5.
Fig. 6.
Fig. 7.
INVENTORS
Walter Rosenberg
Lyle F. Shabram
BY Eugene D. Farley
Atty.

3,007,835
METHOD OF FORMING EDGE-UNITED LAMINAR ARTICLES AND APPARATUS THEREFOR
Walter Rosenberg, Cinebar, Wash., and Lyle F. Shabram, Chehalis, Wash. (P.O. Box 5537, Carmel, Calif.)
Filed May 14, 1956, Ser. No. 584,735
12 Claims. (Cl. 156—251)

This invention relates to a method of forming edge-united laminar articles and to apparatus therefor.

It is a general object of this invention to provide method and apparatus for making gloves and like laminar articles by edge-uniting overlying sheets of thermoplastic material.

It is another object of this invention to provide method and apparatus for making gloves and like edge-united laminar articles in multiple units and in a continuous operation.

It is another object of this invention to provide method and apparatus for making gloves and like edge-united laminar articles using a cover sheet of paper or other nonthermoplastic material which serves also as a conveyor for the articles and as a wrapping therefor.

It is another object of this invention to provide method and apparatus for making edge-united laminar articles such as gloves, the laminae of which are joined together by strong, water impermeable fusion.

It is another object of this invention to provide method and apparatus for forming gloves and other edge-united laminar articles from thermoplastic sheet material without sticking of the material to the forming means employed.

It is another object of this invention to provide method and apparatus which forms edge united laminar articles rapidly in large numbers, the articles being sharply defined and of neat appearance.

It is another object of this invention to provide method and apparatus for producing gloves and like edge-united laminar articles which are sanitary and protected from contamination.

The manner in which the foregoing and other objects of this invention are accomplished will be apparent from the accompanying specification and claims considered together with the drawings, wherein like numerals of reference indicate like parts, and wherein:

FIG. 1 is a view in side elevation of the herein described apparatus;

FIG. 2 is a view in end elevation, partly broken away, of the apparatus of FIG. 1;

FIG. 3 is a detail sectional view taken along line 3—3 of FIG. 2 and illustrating the interior construction of a die used in the herein described apparatus;

FIG. 4 is a plan view of the product of the apparatus of FIGS. 1–3;

FIG. 5 is a detail, fragmentary view illustrating the action of the die member employed in the apparatus of FIGS. 1–3;

FIG. 6 is a detail, sectional view illustrating the product formed by the die action illustrated in FIG. 5; and FIG. 7 is a detail sectional view further illustrating the character of the product formed by the die action illustrated in FIG. 5.

Generally stated the herein described method of forming edge united laminar articles comprises providing two or more overlying sheets of thermoplastic material, superimposing a cover sheet of nonthermoplastic material, and applying a die to the cover sheet side of the resulting assembly, thereby uniting selected lineal contours of the thermoplastic sheets to define the outline of the desired articles and severing the material at the sealing contours so that the articles may readily be separated from each other and from the scrap portions of the sheets. The cover sheet then may be employed as a conveyor for conveying the product away from the die, and as a wrapping medium for packaging it.

The apparatus employed for carrying out the above method comprises a die of suitable design, means for feeding overlying sheets of thermoplastic material to the die, means for superimposing a paper or other nonthermoplastic cover sheet on the first named sheets, means on the die for simultaneously uniting selected contours of the sheets to define the articles formed and severing them from the scrap, and means positioned thereafter for separately conducting the product and the scrap away from the die. In the use of thermoplastic material, the die is heated to a temperature at which the thermoplastic material is softened and welded or fused together, suitable temperature control means being associated with the die. Means also may be placed adjacent the conveying means for separating the formed articles from each other.

Considering the foregoing in greater detail and with particular reference to the drawings:

Overlying webs 10, 12 of the thermoplastic material such as cellulose acetate, cellulose butyrate, polyvinyl chloride, polyvinyl acetate, etc. are fed continuously through the apparatus from rotatably mounted rolls 14, 16. Webs of nonthermoplastic cover material 18, 20 are fed continuously to the apparatus from rotatably mounted rolls 22, 24.

Plastic webs 10, 12 are the full width of the apparatus. Cover material 18, 20, which may be of a thin, water absorbent, but strong paper, preferably are somewhat over half the width of the plastic webs. Rolls 22, 24 are so mounted that the paper webs overlap each other a selected distance, as is particularly evident from FIG. 2, their combined width when overlapped being substantially equal to the width of plastic webs 10, 12. This makes possible the separation of the articles produced by the apparatus in a manner to be desicrbed hereinafter.

The assembly of overlying plastic and paper webs passes over a first feed roll 30 mounted in bearings 32, 34. The shaft of this roll carries a pulley 36 connected by belt 38 to a drive motor 40.

Cooperating with feed roll 30 in driving the overlying webs of material through the apparatus is a conveyor belt 42 which passes over a first pulley 44, journaled in bearings 46 and a second pulley 50, journaled in bearings 52. Pulley 44 is mounted with respect to pulley 30 in such a manner that belt 42 is in frictional engagement with the surface of the latter pulley and accordingly is driven thereby.

The overlying webs of material are fed between pulley 30 and belt 42 and thence across the top surface of the belt in the manner indicated in FIG. 1. They then may pass through suitable means for maintaining them under tension, for example pulleys 54, 56, after which they are wound on a reel, folded, or otherwise processed for packaging and distribution.

As the laminar assembly comprising the overlying webs of plastic 10, 12 and the superimposed overlapping paper cover webs 18, 20 pass over the top of roll 30 and across the top surface of belt 42, a die forms the plastic articles by pressure and heat transmitted through the paper webs. This prevents sticking of the plastic material to the die and also insures fusing of selected contours of the plastic material to each other by a strong, integral bond.

In the illustrated form of the invention the die is designed to form gloves in the plastic webs, the edge contours of which are united simultaneously and severed from the webs to form the finished gloves. These gloves are suitable for many purposes, but are particularly suited for use as disposable gloves by veterinarians.

Accordingly, the die comprises a cylinder 60 carrying on its peripheral surface flanges 62 having a configuration and contour such as to impress upon the sheet assembly the pattern of a succession of gloves angularly arranged with respect to the sheets and lying next to each other. For high capacity from a single machine, the glove design contours are arranged in a double row, the fingers of each row being substantially coextensive intermeshing, each row being substantially coextensive with the width of one of the paper cover webs 18, 20. This arrangement is shown in FIG. 4.

Die 60 is in peripheral pressure relationship to belt 42 and accordingly is driven thereby. It is mounted for rotation on means which permit its longitudinal expansion and contraction.

The illustrated mounting means comprises a first plate 64 mounting spaced rollers 66 at one end of the die, and a second plate 68 mounting spaced rollers 70 at the other end thereof. A roller 72 rotatably mounted on an arm 74 engages one end surface of the die. Another roller 76 mounted on an arm 78 engages the other end surface of the die. Thus the die is confined between rollers 66, 70, 72 and 76. However, it is free to rotate when driven by belt 42 and also is free to expand and contract in an axial direction.

Where the overlying webs of material comprise thermoplastic sheets to be united by the fusion of selected lineal contours, die 60 is provided with an electrical heating assembly illustrated in FIGS. 2 and 3. This assembly includes a longitudinally extending rod 80 mounted between plates 64, 68.

Supported by rod 80 are a plurality of spaced insulators 82 carrying resistance wires 84, 86. These in turn are connected to a source of current by means of a circuit including wire 88, microswitch 90 and wire 92.

As has been indicated above, control of the temperature of the die is important to secure efficient fusing and bonding of the plastic webs while precluding overheating thereof, or of the paper cover webs. Accordingly arm 78 which mounts roller 76 may be pivotally mounted on the frame of the apparatus by means of pin 91. The upper end of this arm carries an adjustable contact point 93 and is connected to the frame by means of a spring 94.

The spring normally urges the contact point 93 into contact with microswitch 90 so that current passes through heating elements 84, 86. However, as the die becomes hot it expands in an axial direction. This rotates arm 78 in a clockwise direction against the tension of spring 94. When the displacement has become sufficiently great, the contact point becomes disengaged from the microswitch, breaking the electric circuit. However, as the die cools and contracts, spring 94 pulls the contact point back into engagement with the microswitch, whereupon the circuit again is completed through the heating elements. In this manner accurate control of the temperature of the die may be obtained. Such control may also be obtained, however, by means of an electric eye or other suitable means.

Die 60 is maintained resiliently in contact with the overlying webs 10, 12, 18 and 20 by fastening plates 64, 68, which mount the die, to a pair of angularly movable side rails 100, 102. These are connected to the frame of the apparatus by hinges 104, 105. Link members 106, 108 are pivotally connected at one end to rails 100, 102, respectively, by means of pins 110, 112. They are pivotally connected at the other end to levers 114, 116 journaled in bearings 118, 120. The outer ends of the levers rest on pegs 122. By lifting up on them, the die assembly may be elevated to permit threading the feed into the apparatus.

Means also are provided for varying the force with which the die bears upon the work. In the form illustrated, this means comprises a receptacle formed by channel iron 124 and containing a weight 126 which may be changed as desired.

Hence as the plastic and paper webs pass beneath the heated die the plastic is melted and fused in the contours directly adjacent flanges 62. This produces two simultaneous effects. In the first place, it causes the melting and separation of the plastic immediately below the flanges. Secondly, it causes the flowing together, fusion and integration of the plastic in the regions on both sides of the flanges.

If it is desired to favor the flowing of a substantial proportion of the plastic toward one side or the other of the flanges, as where it is desired to produce a particularly strong bond on one side thereof, a flange shaped as illustrated in FIG. 5 may be employed.

In this embodiment the flange has a working surface one segment 130 of which is substantially parallel to the surface of the die while another surface 132 is inclined. Then as the die is pressed into the sheets, the inclined surface pushes the molten material outwardly so that a thick, strong fused joint is formed in the area immediately adjacent. This is desirable, for example, where this joint is a component part of the article to be produced while the joint on the opposite side of the flanges forms part of the waste material between the articles.

This effect is illustrated further in FIG. 6, which illustrates the condition of the pressed portion of the webs after they have passed beneath the die roll. It will be seen that the paper web 20 remains continuous. However, the plastic webs 10, 12 have been fused together to form two joints 134, 136. Joint 134 is present on the waste side and is relatively thin.

Joint 136 is present on the article side and is comparatively heavy and strong because of the directional displacement of plastic material by inclined surface 132. Hence when the two thermoplastic layers comprising the article are separated from the remaining webs, the joint between them has the appearance illustrated in FIG. 7, being integral, continuous and substantially as strong as the material itself.

Where a die having a double pattern is employed with two overlapped paper cover webs, the product of the apparatus has the general appearance illustrated in FIG. 4. It comprises two rows of articles, for example, gloves 140, one row being held to paper sheet 18 and the other to sheet 20. Between the articles lie areas of scrap plastic.

To separate one row of articles from the other, and the scrap material from between the articles, there is provided a separating bar assembly comprising a first bar 142 and a second bar 144 spaced from each other and rigidly mounted between support members 146 and 148 affixed to a frame member 150. The top paper sheet with its affixed gloves is threaded around and between the two bars in the manner shown in FIG. 4. This effectuates the separation of the two strips from each other and also loosens the waste plastic between the articles so that it may be removed manually. The two paper webs with the adhering gloves then travel separately between rolls 54, 56 to packaging.

In this manner there is provided method and apparatus for forming edge-united laminar articles such as gloves from the thermoplastic webs which are adaptable to the high speed, low cost production of such articles. Furthermore, the articles are protected from damage during forming by means of a paper or other nonthermoplastic cover web. This cover web in turn forms a convenient conveyor for the formed thermoplastic articles after they leave the apparatus and also provides a packaging material for wrapping them in multiple units. Then when they are used, it may be used as a means for keeping them sanitary, and also as a wiping tissue if such should be desired.

It is to be understood that the form of our invention, herewith shown and described, is to be taken as a preferred example of the same, and that various changes in the shape, size and arrangement of parts may be resorted to without departing from the spirit of our invention or the scope of the subjoined claims.

Having thus described our invention, we claim:

1. The method of continuously forming edge-united laminar articles from thermoplastic materials which comprises providing a plurality of overlying webs of thermoplastic material, superimposing a thin cover web of nonthermoplastic material, and applying a heated contour rotary die to the cover sheet side of the resulting assembly for uniting the thermoplastic webs along the selected lineal contours of said die while simultaneously severing the fused lineal contours from the remainder of the thermoplastic webs and continuously delivering said nonthermoplastic web unbroken with the said formed edge united articles thereon.

2. The method of continuously forming edge-united laminar articles which comprises providing a plurality of overlying webs of thermoplastic material, superimposing a thin cover web of nonthermoplastic material, applying a heated rotary die having the shaped contours of said articles to the cover web side of the resulting assembly, the temperature of the die being insufficient to fuse or separate the cover web but sufficient to fuse the thermoplastic webs together along the contours of the die while simultaneously separating the fused contours from the remainder of the thermoplastic webs and continuously delivering the said nonthermoplastic web unbroken with said formed edge united articles adhering thereto.

3. The method of claim 2 wherein the cover sheet comprises thin paper.

4. The method of claim 2 wherein two overlapping parallel cover webs are provided and a double row of articles is formed in the thermoplastic webs, one row opposite each of the cover sheets, and thereafter the cover webs and thermoplastic articles held thereon are separated from each other.

5. The method of claim 2 wherein the thermoplastic material directly adjacent the die is fused and transferred laterally thereof to form a joint of increased thickness and strength between the overlying thermoplastic webs.

6. The method of claim 2 wherein the formed thermoplastic articles are held along the fused contours to the cover web which thereafter is used as a conveyor for said articles.

7. The method of claim 2 including the step of wrapping the formed thermoplastic articles in the cover web to which they are held to form a package for said articles.

8. Apparatus for continuously forming laminar articles which comprises in combination a cylindrical die containing a plurality of irregular contours, means for rotatably mounting the die, means for feeding to the die an assembly comprising overlying, thermoplastic webs and a cover sheet of nonthermoplastic material with the cover web next to said die contours, means for heating the die contours, means for exerting an adjustable die pressure against the sheet assembly to form the thermoplastic articles, and conveyor means for conveying the formed articles adhering to the unbroken nonthermoplastic web away from the die.

9. The apparatus of claim 8 wherein the means for mounting the die comprises a pair of spaced plates mounted on side rails one on each end of the die, a pair of hingedly mounted side rails, a plurality of rollers on each of the plates for pressure engagement with the periphery of the die, and at least one roller mounted at each end of the die for pressure engagement with the end surfaces thereof.

10. The apparatus of claim 8 including the means for controlling the temperature of the die forming contours comprising an electrically operated heating element in an electric circuit with an electric switch, means for mounting the die for axial expansion and contraction with temperature change, lever means positioned for engagement of one of its ends with an end surface of the die, and contact means on the other end of the lever, the contact means being positioned for actuation of the microswitch upon a predetermined expansion of the die.

11. The apparatus of claim 8 wherein the means for adjusting the pressure exerted by the die comprises a pivotally mounted frame including a pair of side rails, means for connecting the die to the frame, and variable weight means for application to the frame.

12. The apparatus of claim 8 wherein means are provided for applying the cover web in two overlapping, parallel sections each less in width than the width of the overlying thermoplastic webs but combined equaling the full width, and for separating the cover webs with the formed laminar articles thereon after they have been formed by the die.

References Cited in the file of this patent

UNITED STATES PATENTS

| | | |
|---|---|---|
| 1,625,394 | Roberts | Apr. 19, 1927 |
| 2,157,054 | Gammeter | May 2, 1939 |
| 2,325,482 | Curran | July 27, 1943 |
| 2,431,050 | Kopplin | Nov. 18, 1947 |
| 2,460,460 | Langer | Feb. 1, 1949 |
| 2,484,340 | Gardner | Oct. 11, 1949 |
| 2,509,439 | Langer | May 30, 1950 |
| 2,552,353 | Troth et al. | May 8, 1951 |
| 2,581,977 | Spalding et al. | Jan. 8, 1952 |
| 2,616,232 | Meyer | Nov. 4, 1952 |
| 2,621,704 | Langer | Dec. 16, 1952 |
| 2,710,046 | Markus et al. | June 7, 1955 |
| 2,738,828 | Hammer | Mar. 20, 1956 |
| 2,767,769 | Hasselquist | Oct. 23, 1956 |
| 2,773,264 | Nover | Dec. 11, 1956 |
| 2,781,079 | Ruby et al. | Feb. 12, 1957 |